United States Patent
Ozaki et al.

(10) Patent No.: US 10,619,505 B2
(45) Date of Patent: Apr. 14, 2020

(54) CLEARANCE-CONTROL-TYPE SEAL STRUCTURE

(71) Applicant: MITSUBISHI HITACHI POWER SYSTEMS, LTD., Kanagawa (JP)

(72) Inventors: Kohei Ozaki, Tokyo (JP); Hidekazu Uehara, Tokyo (JP); Shin Nishimoto, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 237 days.

(21) Appl. No.: 15/521,045

(22) PCT Filed: Oct. 28, 2015

(86) PCT No.: PCT/JP2015/080314
§ 371 (c)(1),
(2) Date: Apr. 21, 2017

(87) PCT Pub. No.: WO2016/068159
PCT Pub. Date: May 6, 2016

(65) Prior Publication Data
US 2017/0328232 A1    Nov. 16, 2017

(30) Foreign Application Priority Data
Oct. 30, 2014    (JP) .................................. 2014-221050

(51) Int. Cl.
*F01D 11/24*      (2006.01)
*F01D 11/00*      (2006.01)
(Continued)

(52) U.S. Cl.
CPC ............ *F01D 11/24* (2013.01); *F01D 11/001* (2013.01); *F01D 11/003* (2013.01);
(Continued)

(58) Field of Classification Search
CPC ...... F01D 11/003; F01D 11/122; F01D 11/16; F01D 11/18; F01D 11/20; F01D 11/22;
(Continued)

(56) References Cited

U.S. PATENT DOCUMENTS 2,279,863 A * 4/1942 Downer ................. F16J 15/442
                                                        277/413
4,420,161 A * 12/1983 Miller ..................... F01D 25/04
                                                        277/418

(Continued)

FOREIGN PATENT DOCUMENTS

EP    0 094 529    11/1983
EP    1 235 009    8/2002
(Continued)

OTHER PUBLICATIONS

International Search Report dated Jan. 26, 2016 in International Application No. PCT/JP2015/080314, with English translation.

(Continued)

*Primary Examiner* — Kenneth Bomberg
*Assistant Examiner* — Hakeem M Abdellaoui
(74) *Attorney, Agent, or Firm* — Wenderoth, Lind & Ponack, L.L.P.

(57) ABSTRACT

A clearance-control-type seal structure including a plurality of arc-shaped grooves (23) formed side by side in the axial direction with respect to an inner circumferential surface of a housing (22) of a turbine; and abradable seal rings (11, 12) having fitting parts (11a, 12a) that are fitted into the grooves so as to leave a prescribed gap, that have extended parts (11b, 12b) that are exposed from the housing in the radial direction toward the inside and expand in the axial direction, and that, during operation, due to back pressure inside the grooves, receive a force that moves in the radial direction toward the inside. One extended part has a protruding part (Continued)

extending even further in the axial direction toward the upstream side, and the other extended part has formed in an outer circumferential surface of a downstream-side end part thereof a recessed part that corresponds to the protruding part.

6 Claims, 3 Drawing Sheets

(51) Int. Cl.
| | |
|---|---|
| *F16J 15/44* | (2006.01) |
| *F01D 11/20* | (2006.01) |
| *F16J 15/00* | (2006.01) |
| *F01D 11/02* | (2006.01) |
| *F01D 11/10* | (2006.01) |

(52) U.S. Cl.
CPC ............ *F01D 11/025* (2013.01); *F01D 11/10* (2013.01); *F01D 11/20* (2013.01); *F16J 15/002* (2013.01); *F16J 15/445* (2013.01); *F05D 2240/55* (2013.01); *F16J 15/442* (2013.01)

(58) Field of Classification Search
CPC ...... F01D 11/24; F01D 11/025; F01D 11/001; F01D 11/10; F05D 2240/55; F16J 15/445
USPC ..... 415/174.1, 174.2, 174.4, 174.5; 277/419, 277/420
See application file for complete search history.

(56) References Cited

U.S. PATENT DOCUMENTS

| | | | | |
|---|---|---|---|---|
| 5,080,556 | A * | 1/1992 | Carreno | F16J 15/442 |
| | | | | 415/170.1 |
| 6,131,910 | A * | 10/2000 | Bagepalli | F01D 5/225 |
| | | | | 277/355 |
| 6,547,522 | B2 | 4/2003 | Turnquist et al. | |
| 6,572,115 | B1 * | 6/2003 | Sarshar | F16J 15/3288 |
| | | | | 277/412 |
| 6,692,227 | B2 | 2/2004 | Tomita et al. | |
| 8,113,771 | B2 * | 2/2012 | Turnquist | F01D 11/025 |
| | | | | 277/411 |
| 8,360,712 | B2 | 1/2013 | Deo et al. | |
| 9,039,358 | B2 * | 5/2015 | Tholen | F01D 11/12 |
| | | | | 415/173.3 |
| 9,394,999 | B2 * | 7/2016 | Seaton | F16J 15/4472 |
| 9,915,162 | B2 * | 3/2018 | Duguay | F01D 11/20 |
| 2002/0117807 | A1 | 8/2002 | Yoshida et al. | |
| 2008/0309019 | A1 * | 12/2008 | Wolfe | F01D 11/003 |
| | | | | 277/420 |
| 2009/0053050 | A1 | 2/2009 | Bruce et al. | |
| 2010/0078893 | A1 * | 4/2010 | Turnquist | F01D 11/025 |
| | | | | 277/303 |
| 2011/0182719 | A1 | 7/2011 | Deo et al. | |
| 2012/0014778 | A1 * | 1/2012 | Narita | F01D 11/06 |
| | | | | 415/1 |
| 2013/0142628 | A1 * | 6/2013 | Sheng | F04D 29/102 |
| | | | | 415/173.4 |
| 2013/0220196 | A1 * | 8/2013 | Brand | B63H 23/321 |
| | | | | 114/116 |
| 2013/0264775 | A1 * | 10/2013 | Wolfe | F01D 11/003 |
| | | | | 277/545 |
| 2015/0337673 | A1 * | 11/2015 | McCaffrey | F01D 11/20 |
| | | | | 415/173.1 |
| 2016/0053633 | A1 * | 2/2016 | Webb | B23P 15/00 |
| | | | | 415/177 |
| 2019/0017412 | A1 * | 1/2019 | Petrillo | F01D 11/16 |

FOREIGN PATENT DOCUMENTS

| | | |
|---|---|---|
| JP | 58-222902 | 12/1983 |
| JP | 2000-120879 | 4/2000 |
| JP | 2002-235504 | 8/2002 |
| JP | 2002-257242 | 9/2002 |
| JP | 2003-65076 | 3/2003 |
| JP | 2003-521657 | 7/2003 |
| JP | 2005-54625 | 3/2005 |
| JP | 2009-52553 | 3/2009 |
| WO | 01/57420 | 8/2001 |

OTHER PUBLICATIONS

International Preliminary Report on Patentability dated May 2, 2017 in International Application No. PCT/JP2015/080314, with English translation.
Written Opinion of the International Searching Authority dated Jan. 26, 2016 in International Application No. PCT/JP2015/080314.
Office Action dated Mar. 28, 2018 in Korean Patent Application No. 10-2017-7011528, with English translation.
Indian Office Action dated Nov. 13, 2019 in corresponding Indian Application No. 201717014522.

* cited by examiner

CLEARANCE-CONTROL-TYPE SEAL STRUCTURE

TECHNICAL FIELD

The present invention relates to a clearance-control-type seal structure.

BACKGROUND ART

Conventionally, as a structure for steam turbines or gas turbines, there is an abradable seal ring which fulfills the role of a seal between the rotor and housing and an ACC seal structure equipped with ACC (active clearance control) functions, as disclosed in patent documents 1 and 2 below.

The ACC seal structure is a structure which automatically adjusts the gap between the abradable seal ring and a rotor or fins arranged on a rotor.

CITATION LIST

Patent Documents

Patent Document 1: Japanese Unexamined Patent Application Publication No. 2000-120879A
Patent Document 2: Japanese Unexamined Patent Application Publication No. 2003-65076A

SUMMARY OF INVENTION

Technical Problem

For example, in a steam turbine, a structure is used which links four abradable seal rings for the optimization of activation design of the ACC seal structure, and the pressure to activate each abradable seal ring is designed, and the pressure for activating each is different.

When the turbine is started and approaches rated operation, the abradable seal ring designed with low activation pressure is activated first, accompanying the rise of the back pressure (steam pressure).

The abradable seal ring with high load activation is designed to activate thereafter, but there are cases in which it may not activate due to friction with the housing. Note that there is variance in frictional coefficient, and the high load activation abradable seal ring is confirmed to be more difficult to activate than the low load activation abradable seal ring.

Thus, an object of the present invention is to provide a clearance-control-type seal structure wherein each abradable seal ring can be securely activated at a desired time, and a turbine having this clearance-control-type seal structure.

Solution to Problem

A clearance-control-type seal structure according to the first invention to resolve the aforementioned problem includes:
a plurality of arc-shaped grooves, formed side by side in the axial direction relative to the inner circumferential surface of the housing of the turbine, and
a plurality of seal rings having a fitting part fitted into the grooves having a prescribed gap, and extended parts which are exposed from the housing in the radial direction toward the inside and extends in the axial direction, and which receives force to move inside in the radial direction from the back pressure in the grooves, such that
of the plurality of seal rings, for at least a first seal ring and a second seal ring which are next to each other in the axial direction,
the first seal ring activates at a higher load than the second seal ring, and
a second extended part, which is the extended part of the second seal ring, partially overlaps in the radial direction with the first extended part, which is the extended part of the first seal ring, so as to be able to press in the radial direction toward the inside.

The clearance-control-type seal structure according to the second invention to resolve the aforementioned problem includes:
the clearance-control-type seal structure according to the first invention, wherein
the second extended part has
a protruding part formed further extending toward the first seal ring side in an outer circumferential surface of the first seal ring side end part, and
the first extended part has
a recessed part formed in an outer circumferential surface of the second seal ring side end part, corresponding to the protruding part, such that
the protruding part is inserted into the recessed part.

The clearance-control-type seal structure according to the third invention to resolve the aforementioned problem includes:
the clearance-control-type seal structure according to the first invention, wherein
the second extended part has
a protruding part formed further extending toward the first seal ring side on the inside of the prescribed major axis direction from an outer circumferential surface of the first seal ring side end part, and
the first extended part has
a recessed part formed on the inside of the prescribed major axis direction from an outer circumferential surface of the second seal ring side end part, corresponding to the protruding part, such that
the protruding part is inserted into the recessed part.

The clearance-control-type seal structure according to the fourth invention to resolve the aforementioned problem includes:
the clearance-control-type seal structure according to the first invention, wherein
the first extended part has
a protruding part formed further extending toward the second seal ring side on the inside of the prescribed major axis direction from an outer circumferential surface of the second seal ring side end part, and
the second extended part has
a recessed part formed on the inside of the prescribed major axis direction from an outer circumferential surface of the first seal ring side end part, corresponding to the protruding part, such that
the protruding part is inserted into the recessed part.

The clearance-control-type seal structure according to the fifth invention to resolve the aforementioned problem includes:
the clearance-control-type seal structure according to the first invention, wherein
the second extended part has
a second protruding part formed on the inside of the prescribed major axis direction from an outer circumferential surface of the first seal ring side end part, the second protruding part has a part of an arc-shaped flat plate part shaped corresponding to the second protruding part inserted therein, the first extended part has a first recessed part formed corresponding to the arc-shaped flat plate part, such that the arc-shaped flat plate part is inserted into the first recessed part.

A turbine according to the sixth invention to resolve the aforementioned problem has the clearance-control-type control seal structure according to the first invention.

A turbine according to the seventh invention to resolve the aforementioned problem has the clearance-control-type control seal structure according to the second invention.

A turbine according to the eighth invention to resolve the aforementioned problem has the clearance-control-type control seal structure according to the third invention.

A turbine according to the ninth invention to resolve the aforementioned problem has the clearance-control-type control seal structure according to the fourth invention.

A turbine according to the tenth invention to resolve the aforementioned problem has the clearance-control-type control seal structure according to the fifth invention.

Advantageous Effects of Invention

According to the clearance-control-type seal structure and turbine according to the present invention, each abradable seal ring can be securely activated at a desired time.

DESCRIPTION OF EMBODIMENTS

The clearance-control-type seal structure and turbine of the present invention are described below via examples, using drawings.

Example 1

Figure 1:
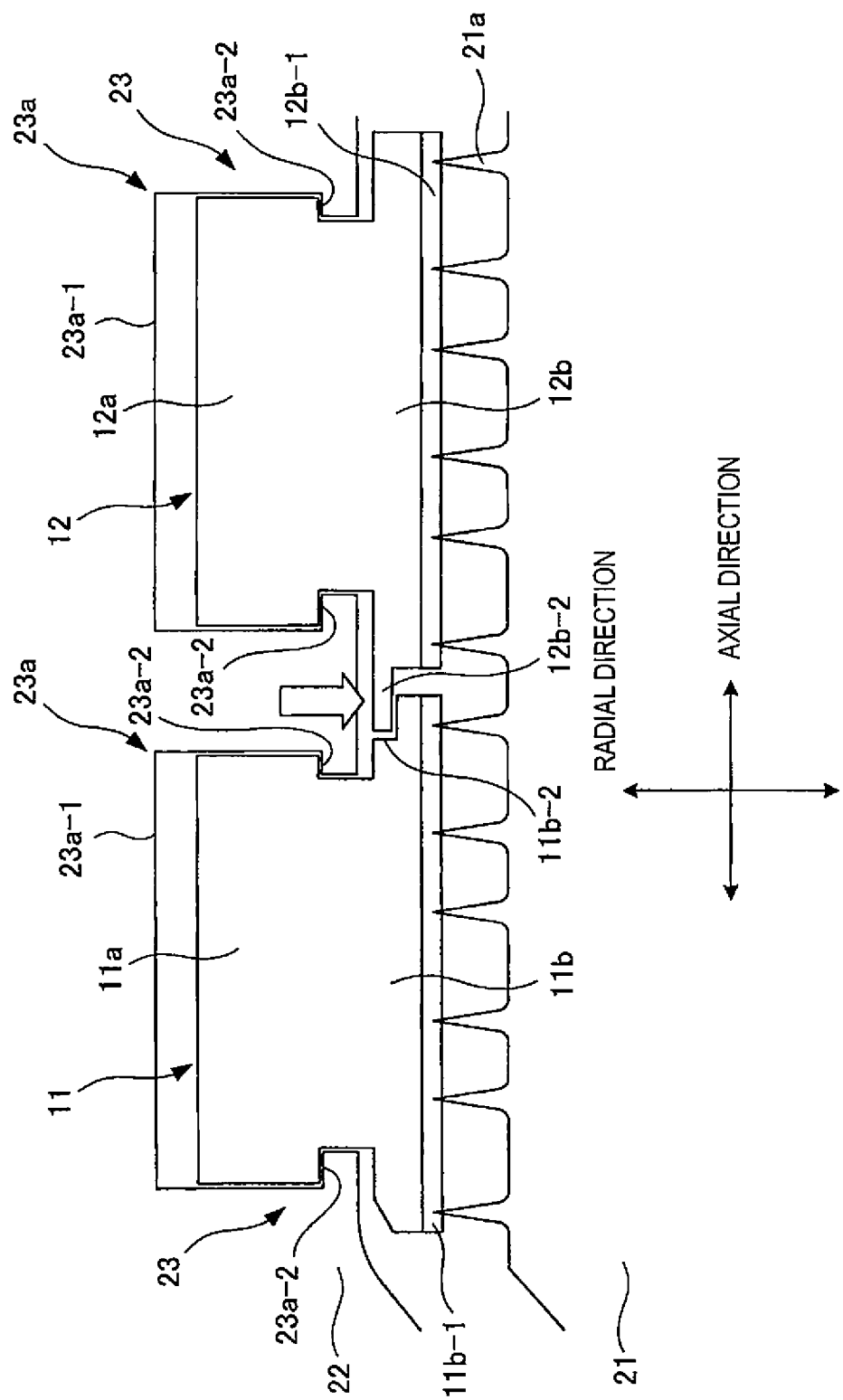
FIG. 1 is a cross-sectional view describing the clearance-control-type seal structure according to Example 1 of the present invention.

FIG. 1 is a cross-sectional view describing the clearance-control-type seal structure according to Example 1 of the present invention. The clearance-control-type seal structure according to Example 1 of the present invention is used in a turbine, and as illustrated in FIG. 1, is first provided with abradable seal rings 11, 12, and a plurality of grooves 23.

Note that in the present example, it is not limited to providing two abradable seal rings, so long as at least two are provided, any number of abradable seal rings may be provided. However, for simplification, the description below is of a first abradable seal ring 11 for the first step and a second abradable seal ring for the second step, which are next to each other in the axial direction. Note that the first abradable seal ring 11 for the first step is given a higher activation load than the second abradable seal ring for the second step.

The first abradable seal ring 11 is provided with a first fitting part 11a and a first extended part 11b. The second abradable seal ring 12 is provided with a second fitting part 12a and a second extended part 12b.

A plurality of arc-shaped grooves 23 are formed side by side in the axial direction on the inner circumferential surface of a housing 22, which surrounds a rotor 21. Each groove 23 has in its interior, an expansion part 23a extending in the axial direction.

The abradable seal rings 11, 12 are each arc-shaped seal rings corresponding to the grooves 23. The fitting parts 11a, 12a of the abradable seal rings 11, 12 are each fitted having a prescribed gap relative to the expansion part 23a of the grooves 23. Further, the extended parts 11b, 12b of the abradable seal rings 11, 12 are each exposed from the housing 22 toward the inside in the radial direction, and extend in the axial direction.

Abradable parts 11b-1, 12b-1 composed of a free-cutting member are each disposed on the inner circumferential surface of the extended parts 11b, 12b of the abradable seal rings 11, 12. The abradable parts 11b-1, 12b-1 oppose a fin 21a disposed on the rotor 21.

During turbine activation (operation), when the fins 21a contact the abradable parts 11b-1, 12b-1, the abradable parts 11b-1, 12b-1 are worn away because they are made of a free-cutting member; there is little impact on the performance of the turbine, and there is hardly loss concerning the fin 21a. Thus, it is possible to bring the abradable parts 11b-1, 12b-1 to the limit position of contacting the fin 21a.

In other words, by providing abradable parts 11b-1, 12b-1 made of a free-cutting member on the abradable seal rings 11, 12, during rated operation, the clearance between the rotor 21 (or a fin 21a disposed on the rotor 21) and the abradable seal rings 11, 12 can be set to a minimum, and the amount of leakage can be reduced.

Further, the abradable seal rings 11, 12 have an ACC seal structure in order to prevent the fin 21a from contacting the abradable part 11b-1, 12b-1 due to axial lengthening and the like when starting or stopping, and to minimize the amount of wear of the abradable parts 11b, 12b.

Specifically, it is a structure such that the position of the abradable seal rings 11, 12 is adjusted by springs (not illustrated) installed on each, which activate on the rotor 21 side via back pressure (steam pressure) immediately before reaching rated operation. That is, the spring force is made to push the abradable seal rings 11, 12 toward the outside in the radial direction. Then, the controls 1 through 3 below are performed.

1. Pre-Activation (Pressure Difference 0)

The abradable seal rings 11, 12 are pressed toward an outer peripheral wall surface 23a-1 of the expanded part 23a of the grooves 23 via the spring force.

2. During Starting (Rising Load, Low Pressure Difference)

Back pressure which presses the abradable seal rings 11, 12 toward the inside in the radial direction is generated in the interior of the expansion part 23a of the grooves 23, but while spring force>back pressure, the abradable seal rings 11, 12 continue to be pressed toward the outer circumferential surface wall surface 23a-1. Note that this is the same during stopping.

3. During Rated Operation (Load 50% or Greater, High Pressure Difference)

Immediately before rated operation, when back pressure>(spring force+frictional force), the abradable seal rings 11, 12 are pressed toward the inner circumferential side wall surface 23a-2 of the grooves 23.

Here, with the clearance-control-type seal structure according to Example 1 of the present invention, in order to allow the second extended part 12b of the second abradable seal ring 12 of the second step to press toward the first extended part 11b of the first abradable seal ring 11 of the first step toward the inside in the radial direction, they partially overlap with each other in the radial direction. This point is described below.

On the second extended part 12b of the second abradable seal ring 12 of the second step, a part of the upstream side (the first abradable seal ring 11 side) is further extended, forming a protruding part 12b-2. Note that the protruding part 12b-2 extends in the circumferential direction of the extended part 12b.

On the first extended part 11b of the first abradable seal ring 11 of the first step, a part of the downstream side (the second abradable seal ring 12 side) is indented, forming a recessed part 11b-2. Note that the recessed part 11b-2 extends in the circumferential direction of the extended part 11b.

Note that, as illustrated in FIG. 1, the recessed part 11b-2 and the protruding part 12b-2 are formed on the outer circumferential surface of the extended parts 11b, 12b, respectively (that is, the aforementioned "part" refers to the outer circumferential surface of the extended parts 11b, 12b).

Further, the recessed part 11b-2 has a shape which corresponds to the protruding part 12b-2, and the wall surface of the recessed part 11b-2 of the first abradable seal ring 11 overlaps the protruding part 12b-2 of the second abradable seal ring 12 when the protruding part 12b-2 is inserted into the indent of the recessed part 11b-2.

That is, the clearance-control-type seal structure according to Example 1 of the present invention is a structure such that, to allow the axial direction end part of the extended part 11b of the first abradable seal ring 11 of the first step to be pressed in the radial direction by the opposing axial direction end part of the extended part 12b of the second abradable seal ring 12 of the second step, the axial direction end parts of each overlap in the radial direction.

By having the aforementioned configuration, when the second abradable seal ring 12 of the second step activates toward the inside in the radial direction between the aforementioned "2. During starting" and "3. During rated operation", the upstream-side end part of the second extended part 12b interferes with the downstream-side end part of the first extended part 11b, and a force works to move the first abradable seal ring 11 of the first step toward the inside in the radial direction. That is, a force works to activate the first abradable seal ring 11 of the first step toward the inside in the radial direction in tandem with the movement of the second abradable seal ring 12 of the second step (outline arrow in FIG. 1).

This allows the case of the first abradable seal ring 11 of the first step not activating due to the influence of friction with the housing 22 to be avoided; conventionally, this was a problem.

Further, there is no variance which occurs in the activation time for each abradable seal ring 11, 12, allowing for smooth activation toward the inside in the radial direction.

Further, during stopping, back pressure stops being generated, and due to the spring force, the abradable seal rings 11, 12 move toward the outside in the radial direction without being influenced by each other, are pressed toward the outer circumferential surface wall surface 23a-1, and return to the pre-activation state. Alternatively, when the first abradable seal ring 11 of the first step returns to the pre-activation state, the second abradable seal ring 12 of the second step also returns to the pre-activation state due to the protruding part 12b-2 being pressed toward the outside in the radial direction by the wall surface of the recessed part 11b-2.

Note that the clearance-control-type seal structure according to Example 1 of the present invention can be assembled relatively easily by first assembling the second abradable seal ring 12 of the second step.

The clearance-control-type seal structure according to example 1 of the present invention has been described above; in other words, the clearance-control-type seal structure according to Example 1 of the present invention is composed of a plurality of arc-shaped grooves, formed side by side in the axial direction relative to the inner circumferential surface of the housing of the turbine, and a plurality of seal rings having a fitting part fitted into the grooves having a prescribed gap, and an extended part which is exposed from the housing in the radial direction toward the inside and extends in the axial direction, and which receives force during operation to move inside in the radial direction from the back pressure in the grooves, such that of the plurality of seal rings, for at least a first seal ring of the first step and a second seal ring of the second step which are next to each other in the axial direction, the second extended part, which is the extended part of the second seal ring, partially overlaps in the radial direction with the first extended part, which is the extended part of the first seal ring, so as to allow a pressing force in the radial direction toward the inside.

In particular, on the second extended part, on the outer circumferential surface of the upstream-side end part is formed a protruding part, which is further extended toward the upstream side in the axial direction, and on the first extended part, on the outer circumferential surface of the downstream-side end part is formed a recessed part, which corresponds to the protruding part, such that the protruding part is inserted into the recessed part.

Thus, the clearance-control-type seal structure according to Example 1 of the present invention allows each abradable ring to be securely activated at a desired time.

Example 2

The clearance-control-type seal structure according to Example 2 of the present invention is the clearance-control-type seal structure according to Example 1 of the present invention, which has been partially changed. The points of difference between the clearance-control-type seal structure according to Example 1 of the present invention are primarily described below; descriptions for identical configurations are omitted to the extent possible.

Figure 2:
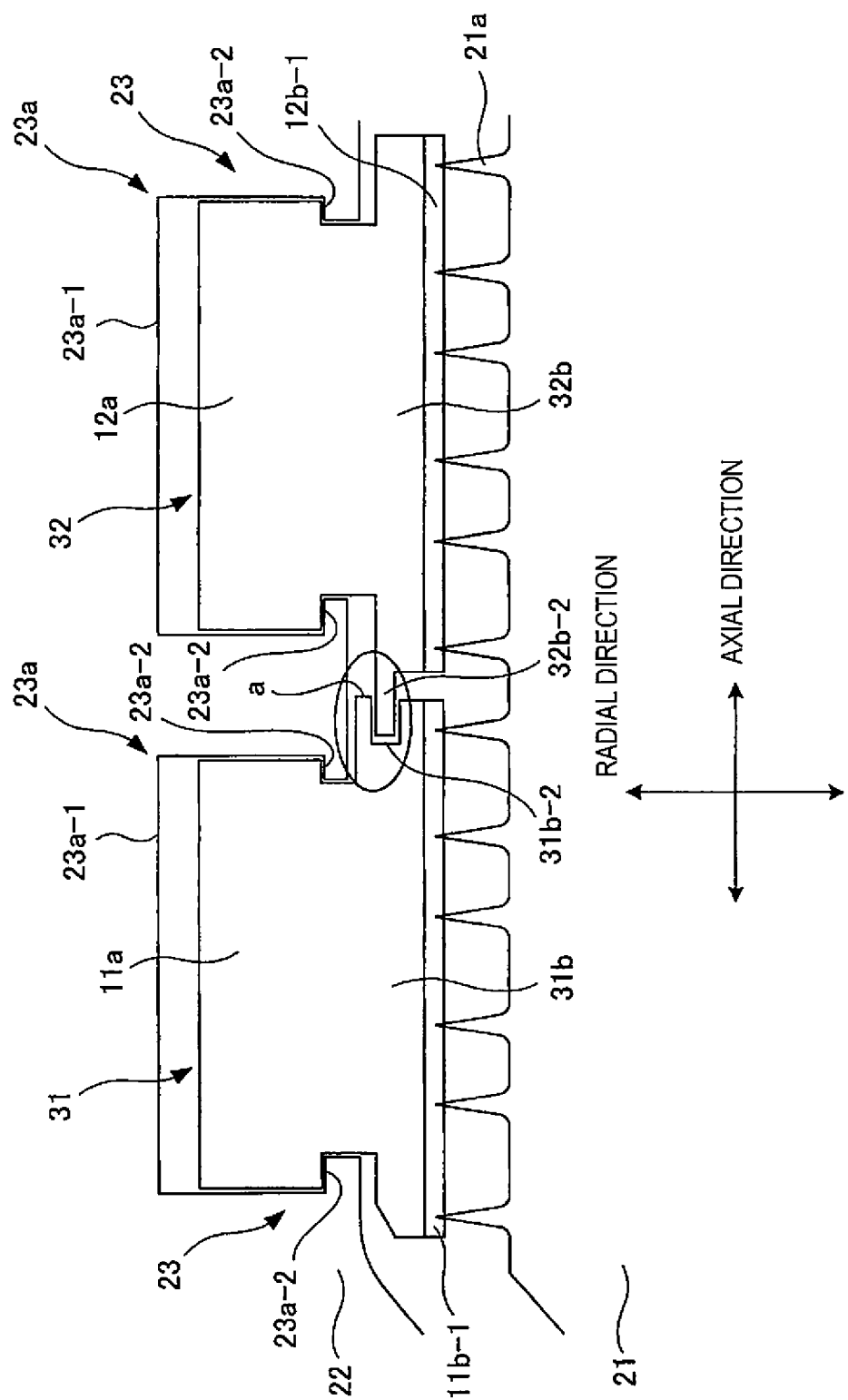
FIG. 2 is a cross-sectional view describing the clearance-control-type seal structure according to Example 2 of the present invention.

FIG. 2 is a cross-sectional view describing the clearance-control-type seal structure according to Example 2 of the present invention. Note that in FIG. 2, configurations identical to Example 1 are given the same symbols as in FIG. 1.

As for the clearance-control-type seal structure according to Example 2 of the present invention, as illustrated in FIG. 2, the position at which the recessed part 31b-2 and protruding part 32b-2 are formed on the first extended part 31b and the second extended part 32b of the first abradable seal ring 31 and the second abradable seal ring 32 is different than that of the recessed part 11b-2 and the protruding part 12b-2 on the first extended part 11b and the second extended part 12b of the clearance-control-type seal structure according to Example 1 of the present invention.

That is, the clearance-control-type seal structure according to Example 2 of the present invention has the recessed part 31*b*-2 and the protruding part 32*b*-2 formed at a position on the inside in the radial direction to a prescribed length (length a) from the outer circumferential surface of the first extended part 31*b* and the second extended part 32*b*, respectively.

Further, the protruding part 32*b*-2 of the second extended part 32*b* is inserted into the recessed part 31*b*-2 of the first extended part, which makes for a state such that both wall surfaces in the radial direction of the recessed part 31*b*-2 sandwich the protruding part 32*b*-2 in the radial direction.

Thus, the clearance-control-type seal structure according to Example 2 of the present invention allows the second abradable seal ring 32 of the second step to press toward the first abradable seal ring 31 of the first step, not only when pressure is increasing, but when the abradable seal rings 31, 32 return to the outside in the radial direction as pressure is decreasing (during stopping).

Note that in the above, the recessed part 31*b*-2 is formed on the first extended part 31*b* of the first abradable seal ring 31, and the protruding part 32*b*-2 is formed on the second extended part 32*b* of the second abradable seal ring 32; however, it may be reversed, such that the protruding part 32*b*-2 is formed on the first extended part 31*b* of the first abradable seal ring 31, and the recessed part 31*b*-2 is formed on the second extended part 32*b* of the second abradable seal ring 32.

The clearance-control-type seal structure according to Example 2 of the present invention has been described above; in other words, the clearance-control-type seal structure according to Example 2 of the present invention is such that the second extended part has a protruding part formed further extending toward the upstream side in the axial direction (first abradable seal ring 11 side) from the outer circumferential surface of the upstream-side end part to a prescribed length in the radial direction on the inside, and the first extended part has a recessed part formed from the outer circumferential surface of the downstream-side end part to a prescribed length in the radial direction on the inside, corresponding to the protruding part, such that the protruding part is inserted into the recessed part.

As described above, the protruding part and the recessed part may be switched. That is, the first extended part may have a protruding part formed further extending toward the downstream side in the axial direction (second abradable seal ring 12 side) from the outer circumferential surface of the downstream-side end part to a prescribed length in the radial direction on the inside, and the second extended part may have a recessed part formed from the outer circumferential surface of the upstream-side end part to a prescribed length in the radial direction on the inside, corresponding to the protruding part, such that the protruding part is inserted into the recessed part.

In this manner, the clearance-control-type seal structure according to Example 2 of the present invention allows each abradable ring to be securely activated at a desired time.

Example 3

The clearance-control-type seal structure according to Example 3 of the present invention is the clearance-control-type seal structure according to Example 1 of the present invention, which has been partially changed. The points of difference between the clearance-control-type seal structure according to Example 1 of the present invention are primarily described below; descriptions for identical configurations are omitted to the extent possible.

Figure 3:
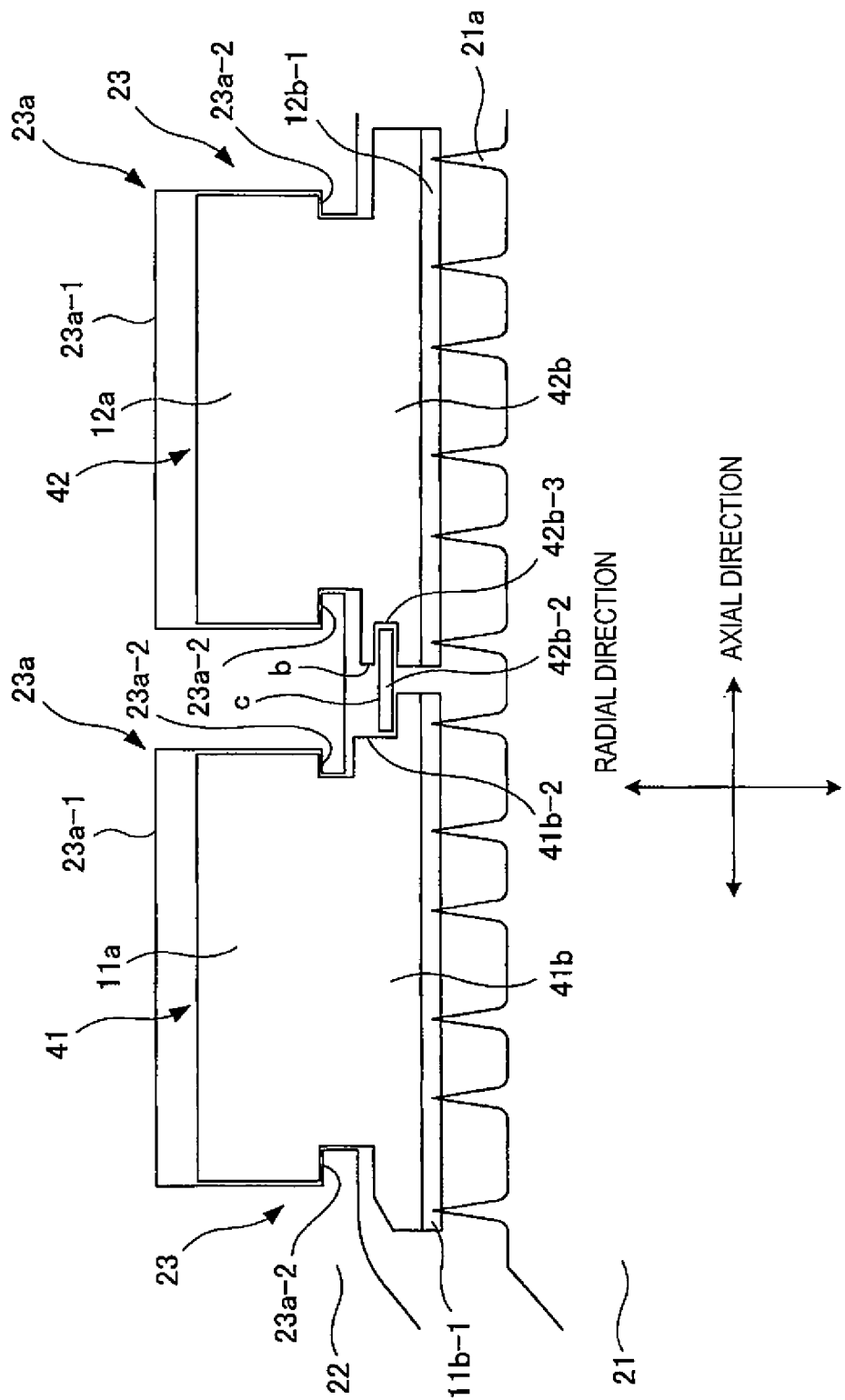
FIG. 3 is a cross-sectional view describing the clearance-control-type seal structure according to Example 3 of the present invention.

FIG. 3 is a cross-sectional view describing the clearance-control-type seal structure according to Example 3 of the present invention. Note that in FIG. 3, configurations identical to Example 1 are given the same symbols as in FIG. 1.

As illustrated in FIG. 3, in the clearance-control-type seal structure according to Example 3 of the present invention, the shape of the second extended part 42*b* is different from the shape of the second extended part 12*b* of the clearance-control-type seal structure according to Example 1 of the present invention.

The clearance-control-type seal according to Example 3 of the present invention has a metal arc-shaped flat plate 42*b*-2 and a second recessed part 42*b*-3 on the second extended part 42*b* of the second abradable seal ring 42.

The second recessed part 42*b*-3 is formed in a position on the inside in the radial direction to a prescribed length (length b) from the outer circumferential surface of the upstream-side end part of the second extended part 42*b*; the arc-shaped flat plate 42*b*-2 has a shape corresponding to the second recessed part 42*b*-3, and a part in the radial direction is inserted into the second recessed part 42*b*-3, and by having a prescribed width (length c) in the radial direction, takes on the role of the protruding part 12*b*-2, 32*b*-2 of Examples 1 and 2.

Further, a (first) recessed part 41*b*-2 is formed on the downstream side of the first extended part 41*b* of the first abradable seal ring 41. The recessed part 41*b*-2 has a shape corresponding to the arc-shaped flat plate 42*b*-2.

When the arc-shaped flat plate 42*b*-2 is partially inserted into the indent of the recessed part 41*b*-2, the wall surface of the recessed part 41*b*-2 of the first abradable seal ring 41 and the arc-shaped flat plate 42*b*-2 of the second abradable seal ring 42 overlap.

Note that in FIG. 3, the recessed part 41*b*-2 is illustrated so the shape of the wall surface in the radial direction has only one side, as in the recessed part 11*b*-2 (FIG. 1) of Example 1, but the present example is not limited to this, and may have a wall surface in the radial direction on both sides, as in the recessed part 31*b*-2 (FIG. 2) of Example 2.

That is, in the clearance-control-type seal structure according to Example 3 of the present invention, the activation of the second abradable seal ring 42 of the second step can be transmitted to the first abradable seal ring 41 of the first step as the arc-shaped flat plate 42*b*-2 takes on the role of the protruding parts 12*b*-2, 32*b*-2 in Examples 1 and 2 by inserting the arc-shaped flat plate 42*b*-2 between the axial direction end parts of the first abradable seal ring 41 and the second abradable seal ring 42.

The clearance-control-type seal structure according to Example 3 of the present invention improves assemblability via the aforementioned configuration because the arc-shaped flat plate 42*b*-2 is inserted after the abradable seal rings 41, 42 are individually assembled.

The clearance-control-type seal structure according to Example 3 of the present invention has been described above; in other words, the clearance-control-type seal structure according to Example 3 of the present invention has a second recessed part formed on the inside in the radial direction at a prescribed length from the outer circumferential surface of the upstream-side end part of the second extended part, and an arc-shaped flat plate having a shape corresponding to the second recessed part is partially inserted into the second recessed part, a first recessed part corresponding to the arc-shaped flat plate is formed on the first extended part, and the arc-shaped flat plate is partially inserted into the first recessed part.

The clearance-control-type seal structure according to the present invention has been described by Examples 1 to 4 above, but the clearance-control-type seal structure according to the present invention may be applied to all series of abradable seal rings, and may also be applied to just one part of the abradable seal rings which have poor activation properties.

Note that in Examples 1 to 4, the description was given with the abradable seal ring 11 as the first step and the abradable seal ring 12 as the second step, but as for the abradable seal ring 11 and the abradable seal ring 12, it is not important which is the first step and which is the second step. That is, as for the first abradable seal ring 11 and the second abradable seal ring 12, it is not the relationship of first and second, but rather the size of the activation load, which is important.

Thus, as has been discussed, as long as the abradable seal ring 11 has a higher activation load than the abradable seal ring 12, the description given in Examples 1 to 4 still stands, even if the relationship of first and second is switched.

In this manner, the clearance-control-type seal structure according to the present invention allows for the reduction of the influence of frictional resistance and for the secure activation of each abradable seal ring at a desired time when activating ACC.

INDUSTRIAL APPLICABILITY

The present invention is suitable as a clearance-control-type seal structure.

REFERENCE SIGNS LIST 11, 31, 41 first abradable seal ring
11a first fitting part
11b, 31b first extended part
11b-1 first abradable part
11b-2, 31b-2, 41b-2 recessed part
12, 32, 42 second abradable seal ring
12a second fitting part
12b, 32b, second extended part
12b-1 second abradable part
12b-2, 32b-2 protruding part
42b-2 arc-shaped flat plate
42b-3 second recessed part
21 rotor
21a fin
22 housing
23 grooves
23a expansion part
23a-1 outer circumferential side wall surface
23a-2 inner circumferential side wall surface

The invention claimed is:

1. A seal structure comprising:
a plurality of arc-shaped grooves, formed side by side in an axial direction relative to an inner circumferential surface of a housing of a turbine, and
a plurality of seal rings having fitting parts fitted into the grooves, respectively, and extended parts that are exposed from the housing in the radial direction toward the inside and extend in the axial direction,
each of the fitting parts forming a prescribed gap with the groove in the axial direction, and each of the plurality of seal rings, during operation, receives force to move inside in the radial direction from a back pressure in the grooves, such that
of the plurality of seal rings, for at least a first seal ring and a second seal ring which are next to each other in the axial direction,
the first seal ring is given a higher activation load of the back pressure than the second seal ring, and
a second extended part, which is the extended part of the second seal ring, partially overlaps in the radial direction with a first extended part, which is the extended part of the first seal ring, so as to be able to press the first extended part in the radial direction toward the inside.

2. The seal structure according to claim 1, wherein the second extended part includes a protruding part formed further extending toward the first seal ring side in an outer circumferential surface of the first seal ring side end part, and
the first extended part includes a recessed part formed in an outer circumferential surface of the second seal ring side end part, corresponding to the protruding part, such that the protruding part is inserted into the recessed part.

3. The seal structure according to claim 1, wherein the second extended part includes a protruding part formed further extending toward the first seal ring side on the inside of the prescribed major axis direction from an outer circumferential surface of the first seal ring side end part, and
the first extended part includes a recessed part formed on the inside of the prescribed major axis direction from an outer circumferential surface of the second seal ring side end part, corresponding to the protruding part, such that the protruding part is inserted into the recessed part.

4. The seal structure according to claim 1, wherein the first extended part includes a protruding part formed further extending toward the second seal ring side on the inside of the prescribed major axis direction from an outer circumferential surface of the second seal ring side end part, and
the second extended part includes a recessed part formed on the inside of the prescribed major axis direction from an outer circumferential surface of the first seal ring side end part, corresponding to the protruding part, such that the protruding part is inserted into the recessed part.

5. The seal structure according to claim 1, wherein the second extended part includes a second recessed part formed on the inside of the prescribed major axis direction from an outer circumferential surface of the first seal ring side end part,
the second recessed part has a part of an arc-shaped flat plate part shaped corresponding to the second recessed part inserted therein,
the first extended part includes a first recessed part formed corresponding to the arc-shaped flat plate part, such that the arc-shaped flat plate part is partially inserted into the first recessed part.

6. A turbine comprising:
the seal structure according to claim 1; and
a housing having an inner circumferential surface on which the plurality of arc-shaped grooves is formed side by side in the axial direction.

* * * * *